PORTABLE PHONOGRAPH

Filed Oct. 22, 1965 2 Sheets-Sheet 1

INVENTOR
P. C. DIMITRACOPOULOS

INVENTOR.

P. C. DIMITRACOPOULOS

United States Patent Office 3,408,080
Patented Oct. 29, 1968

3,408,080
PORTABLE PHONOGRAPH

Panayotis C. Dimitracopoulos, 3435 Drummond St., Suite 26, Montreal, Quebec, Canada
Filed Oct. 22, 1965, Ser. No. 501,488
9 Claims. (Cl. 274—9)

ABSTRACT OF THE DISCLOSURE

A portable phonograph which can play in any position and while it is moved about, having no turntable and thus being free of its gyroscopic effect, the phonographic record being rotated about a spindle by a pair of opposed rollers engaging it on opposite faces, and the phonographic arm having a U-like shape, straddling the record and gripping both its sides in pincers-like fashion.

This invention relates to portable phonographs and more specifically it is a novel compact and highly portable phonograph, that will play in any position whatsoever, even when carried by a walking person, or placed in a moving vehicle.

Audio information may be recorded in several ways, for example, to name only a few, by means of phonographic, magnetic (tape and wire recorders), photoelectric (movie sound), electrostatic and other methods.

While some of the above-listed methods are independent of gravity, in the sense that sound reproduction may be obtained by using the particular device in almost any position or even in a moving and/or vibrating environment, the conventional phonograph is very sensitive to external vibration and motion and can only operate in a specific and stationary position.

However, the amount of information that a phonographic record may contain within a given size and volume, and a given quality of reproduction, is unsurpassed by nearly any other medium.

The new microgroove or micro-microgroove recording techniques and the new, extremely thin records (a few thousandths of an inch thick), have increased the usefulness of the phonographic medium.

To these factors, one must add the easy and very inexpensive methods available today for mass-duplication of such phonographic records.

It is therefore the object of the present invention to provide a novel, small and portable phonograph, capable of accepting the new thin microgroove records, and reproduce them with good sound quality, even while this phonograph is carried by a walking person, or placed in a moving environment.

A further object of the present invention is to provide such novel phonograph in which the mere action of lifting or opening its cover, automatically lifts the arm away from the record and indexes said arm to its outermost position (or innermost position, depending upon the design requirements) in preparation for the next playing cycle, and simultaneously disengages the record spindle, in order to facilitate the record insertion and removal.

It is a further object of the present invention to provide such novel phonograph with a novel phonographic arm, which is free of the usual gravity and inertia problems commonly associated with phonographic arms. Other objects will become evident from the description, illustrations and claims, which follow.

The invention will now be described in some detail in connection with some specific chosen embodiments thereof, reference being made to the accompanying drawings, in which.

The new microgroove or micro-microgroove records, and the new very slow recording and reproducing speeds available today, make possible the manufacturing of phonographic records having a large amount of information contained in them, and therefore, their playing time may last for several minutes, and in some instances, hours. Furthermore, it is now possible to provide such records on extremely thin sheets of materials, for example 10, 5 or even fewer, thousandths of an inch.

Consequently, assuming that a five-thousandths of an inch thickness is selected, two hundred records stacked one upon another, have only a total thickness of ONE INCH. Even if each of these records contains only fifteen minutes of information (and this can easily be at least doubled), such one-inch stack of records may contain fifty (50) hours of information.

A simple, compact and portable phonograph, accepting these records, and carried by means of a strap (i.e. like a photographic camera) by a person, has innumerable applications, to name a few, entertainment, educational and instructional.

For example, a tourist visiting a city or some archeological place, may be provided with such a phonograph together with a quantity of records, describing the city or archeological place, and instead of contracting the services of a guide, he simply shoulders his novel phonograph, inserts the appropriate record, and receives the explanations, not from a mere guide of doubtful competence, but from the most qualified specialist. Perhaps these records and phonographs could be rented by the travel agencies.

In the same manner, an inexperienced person in some developing nation, may be provided with such phonograph and records and receive step-by-step instructions on how to perform a complex manufacturing, agricultural or other operation.

Languages and various subjects and information may be taught or transmitted in this way, and the number of possible applications is almost endless.

Figure 1:
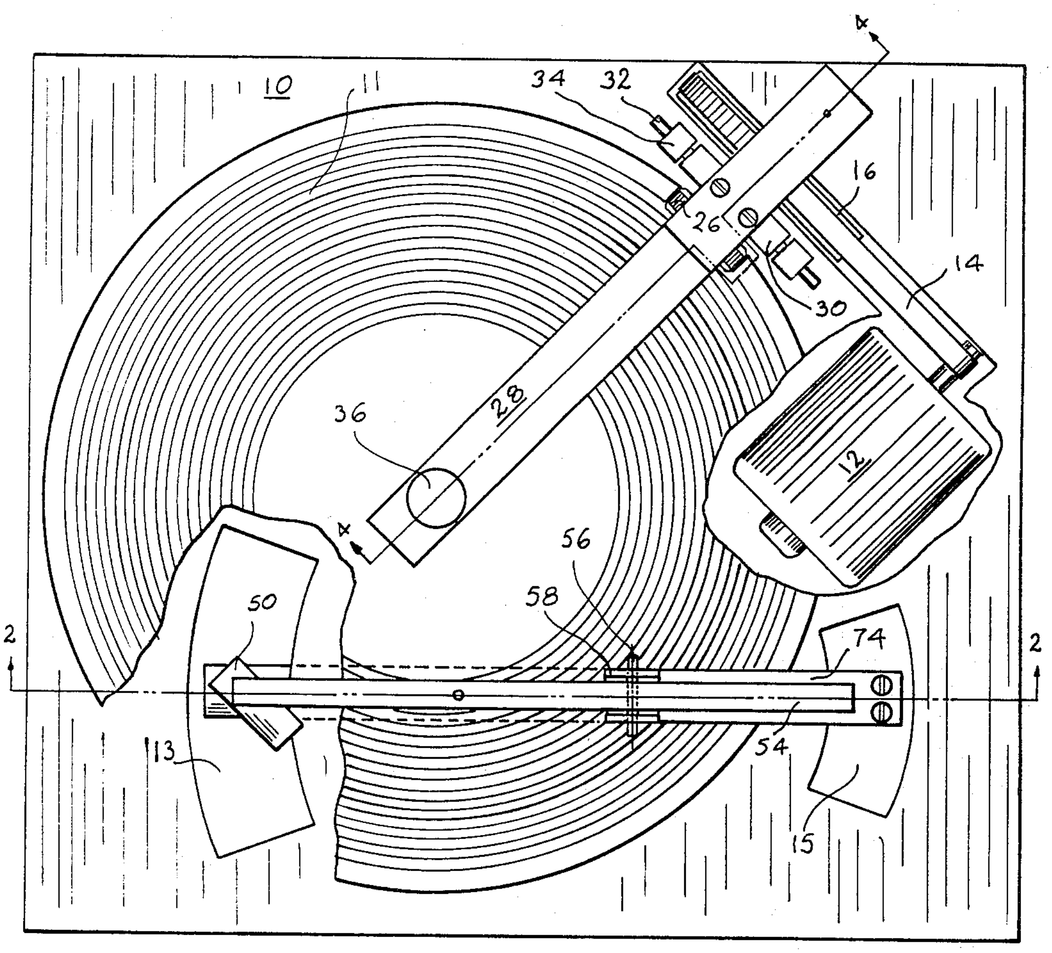
FIGURE 1 is a plan view, with parts broken away, of one preferred form of the phonograph according to the invention, and illustrates the major chassis-mounted parts and components removed from their cabinet or housing.

FIGURE 1 illustrates the main plate or chassis 10 of the phonograph romoved from its cabinet. The major parts and components of this phonograph are mounted on this chassis 10, and 11 denotes a phonographic record inserted in its normal playing position. Parts of chassis 10 and record 11 have been broken away, to expose components lying underneath them, and thus simplify the description that follows.

The usual turntable employed in phonographs acts as a gyroscope and tends to keep its own speed regardless of any outside motion. Thus, if the turntable rotates clockwise and a fast counterclockwise motion is imparted to the cabinet or chassis, the relative speed of the record in respect to the phonograph transducer (or needle) will increase. It will decrease if the fast outside motion is clockwise. In phonographic reproduction, record speed variations are totally unacceptable, because they seriously impair the sound quality. Consequently, turntables must be ruled out in this application, and therefore, this novel phonograph has none. It uses a different manner for rotating the phonographic record 11, as will be described below.

Figure 4:
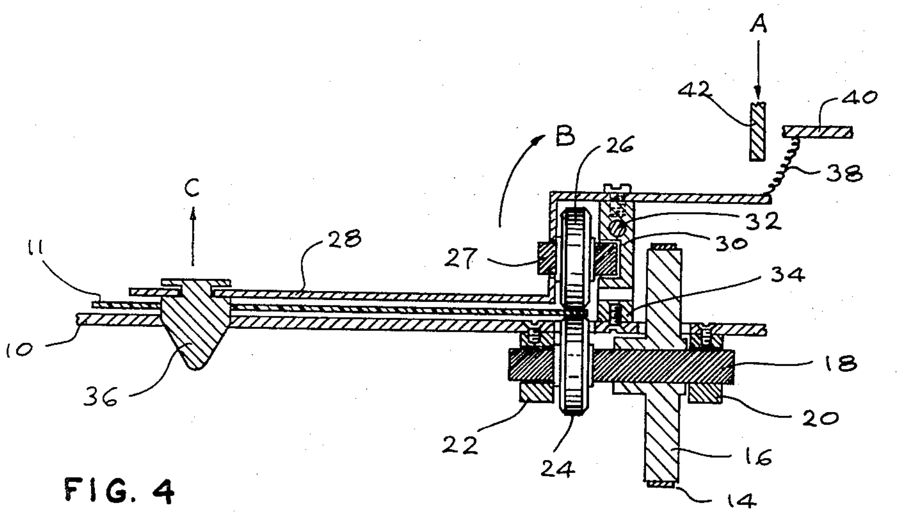
FIGURE 4 is a sectional view taken along line 4—4 of FIG. 1.

Reference being made to FIGURES 1 and 4, motor 12 (mounted underneath chassis 10) through belt 14, drives flywheel 16, whose shaft 18 freely rotates in bearings 20 and 22. These bearings 20 and 22 are permanently secured to chassis 10 by means of screws or other fastening means. Permanently secured to shaft 18, and therefore turning with it at the same rotary speed as flywheel 16, is wheel 24, whose outer circumference is coated with rubber or similar material. Wheel 24 touches record 11 and a substantially similar wheel 26 touches the other side of the record, so that the axis of wheels 24 and 26 and their lines of contact with record 11, substantially lie in one single plane. Wheel 26 is permanently secured to its shaft 27, which freely rotates in bearing cavities of bracket 28 and plate 30, which is permanently secured to the bracket 28, for example by means of screws. Permanently secured to chassis 10, for example by means of screws, is a U-shaped bracket 34, and shaft 32 passes through the bracket 34 and the plate 30, and thus the whole assembly of bracket 28, along with its freely rotating wheel 26, may pivot around shaft 32.

The phonographic record 11 has the usual center hole which is inserted about the record spindle 36, and the record 11 rotates about this spindle 36, in the usual manner. But to facilitate the insertion and removal of records, this record spindle 36 is not secured to the chassis 10, but to the bracket 28, and chassis 10 has a corresponding hole through which the end of the spindle may freely pass. Spring 38 is attached to cabinet 40 (or to some other convenient post or bracket, permanently secured to chassis 10) and its other end is attached to the end of bracket 28 as illustrated in FIG. 4, and thus forces the spindle 36 through the center hole of the record 11, and also forces wheel 26 against the record 11 and wheel 24. In this manner, the two wheels 24 and 26 "pinch" the record 11 and give it the desired rotation, without having to resort to the usual turntable. When the cover or lid 44 is lifted in the direction of arrow D (see FIG. 2), it pivots about pivot 46, and its opposite end 42 moves in the direction of arrow A. Referring again to FIG. 4, the end 42 moves in the direction of arrow A, and thereby makes contact with bracket 28 and pushes it against the force of spring 38, thus the bracket 28 pivots about the shaft 32 in the direction of arrows B and C, the wheel 26 breaks contact with the record 11 and the record spindle moves in the direction of arrow C, away from the record. Thus a record may be removed and a new one insertetd by lifting the phonograph cover or lid.

Figure 2:
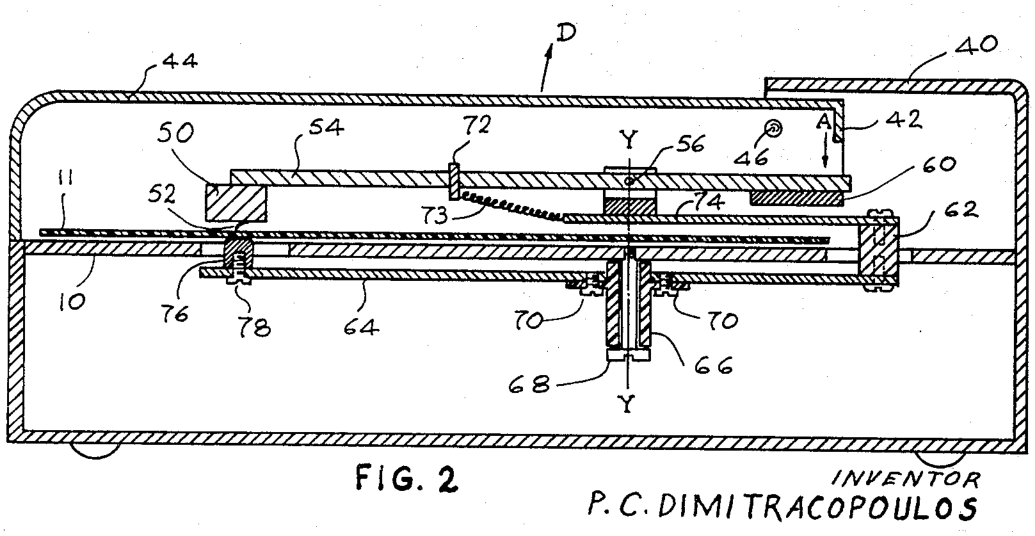
FIGURE 2 is a sectional view of a phonograph according to the invention, including a preferred form of its cabinet or housing, and corresponds to a section taken along line 2—2 of FIG. 1. In this FIG. 2, the entire record-driving mechanism is removed for clarity.
Figure 3:
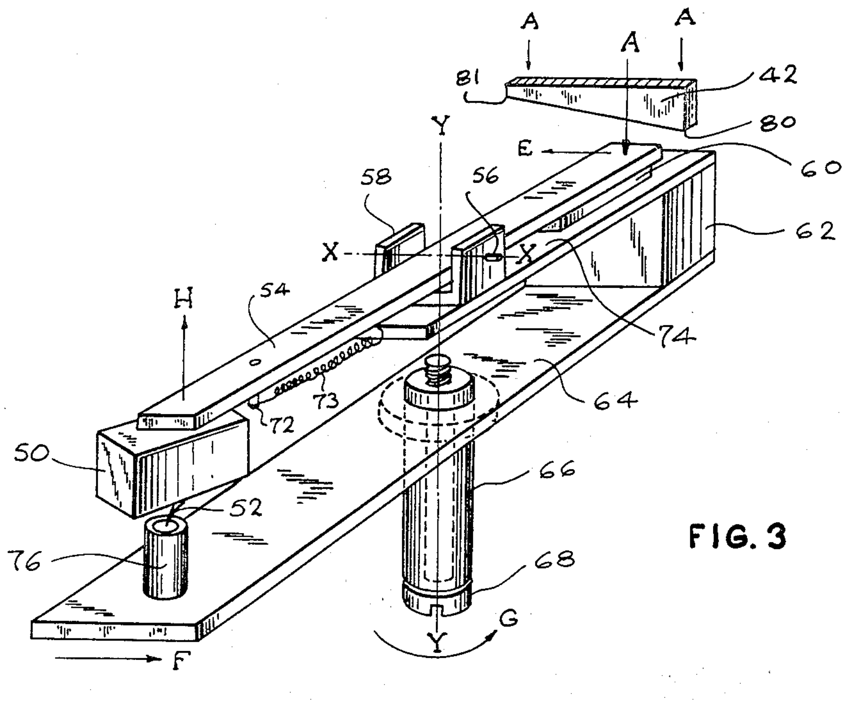
FIGURE 3 is a perspective view of the typical and preferred form of the phonographic arm, employed in the present invention.

The arm of this phonograph is also novel, and it shall be described by referring to FIGURES 1, 2 and 3. Essentially, and in its simplest form, this arm may be described as a two-pronged yoke straddling the record and carrying a sound transducer having two degrees of freedom, the first about an axis perpendicular to the plane of the record (when the record is placed in its playing position in the apparatus) and a second perpendicular to the first. Starting with FIGURE 3, which is a perspective view of the arm, 50 designates the phonographic transducer, terminating in the usual phonographic needle or point 52. The transducer 50 is secured to, or forms part of, arm 54, which pivots about pivot 56. Pivot 56 is journalled in U-shaped member 58, which is firmly secured to, or forms part of, plate 74, which is, in turn, secured to plate 64 through spacer 62. Bearing means 66 is secured to plate 64 by means of, for example, screws 70 (see FIG. 2), so that parts 58, 74, 62, 64 and 66 are all firmly secured to one another, or they may all be cast, or otherwise constructed, in one single member or component. Bearing 66 is journalled around shoulder screw 68 which is threaded on chassis 10 (see FIG. 2) and thus pivots the whole arm assembly about axis Y—Y (see FIG. 3). Plastic and substantially cylindrical member 76 is secured to plate 64, for example by means of screw 78, and spring 73 attached to post 72 and plate 74, pulls point or needle 52 against member 76, in a "pinching" action. Thus, the arm assembly has two degrees of freedom, one about axis X—X, and the other about axis Y—Y, but by separating the X—X from the Y—Y axis (through the U-shaped member 74–62–64), it is now possible to "straddle" the record 11, as it may be seen in FIGURES 1 and 2. This affords a much shorter arm length, while through counterweights 60 and 62 the whole arm assembly is balanced about the X—X and the Y—Y axis. The chassis 10 has two cutouts or holes 13 and 15, so that plate 64 and bearing means 66 lie underneath it, while most of the remaining arm lies over the chassis 10, and while the arm "straddles" the record 11, member 76 and needle 52 "pinch" the record and in this way (regardless of the position of the phonograph) the needle 52 is forced to follow the phonographic groove of record 11.

When cover or lid 44 is lifted, it swings about pivot 46, the end-piece 42 contacts the back part of the plate 54 (in the direction of arrow A) and thereby lifts the transducer 50 and the needle 52 away from record 11. But the part of the end-piece 42 immediately above the arm has a slope or ramp 80–81 (refer now tod FIG. 3), and therefore, upon contacting and pushing the back part of the arm in the direction of arrow A, it also (due to the Y—Y axis bearing) imparts a motion in the direction of arrow E, and therefore, while needle 52 breaks contact with the record, the whole arm assembly rotates in the direction of arrow G, and the needle in the direction of arrow F, and thereby the arm automatically moves in its outermost position, in preparation of the next reproduction or "playback" operation.

It is evident that if the spiral of the record was winding from inside-out, rather than outside-in, the ramp 80–81 would slope in the opposite direction.

It must also be pointed out that while specific reference was made to phonographic records, phonographic transducers, phonographic needles, and generally phonographic reproduction, this was only done to simplify the description and illustrations and it is not intended to limit this invention to strictly the phonographic system. Other audio recording and reproduction systems, using grooved recordings (spiral, cylindrical, belt, etc.) may employ this mechanism, and as an illustration or example, we shall mention spiral, pregrooved "magnetic discs," in which case, the transducer 50 becomes a "magnetic transducer or head" and the needle 52 becomes the "shoe" or "gap-end" of the magnetic circuit of the transducer.

It is also evident that the usual leads or wires (not shown for clarity), connecting the transducer to the associated electronics, were not shown, since they are well known in the art.

Cylindrical member 76 is actually a "support" for the record 11 against the force of the needle 52, and may take other shapes. It may even incorporate on its uppermost end (or the end touching the record 11) a freely rotating ball or roller.

It is also evident that, while part 42 and ramp 80–81 have both been shown and described as being permanently secured to, or forming part of the cover or lid 44, this was only done for clarity and simplicity, and both or either of them may not form part of, or be secured to, cover or lid 44, but they may be independently pivotally supported on chassis 10 and linked to cover or lid 44 (or to some other lever or actuating member) through the usual links, cables, pulleys and the like.

The method of securing one part to another and the actual shape of the various parts has been either shown in one specific way or in a greatly simplified form, in order to simplify the description and drawings and thus help the understanding of the principles of the invention, and in using words of limited or specific meaning, it is not intended to exclude modifications of the particular mechanisms disclosed herein, that will be apparent to those skilled in this art, without departing from the spirit of the invention.

I claim:

1. A phonograph for flat disc records having a central hole and a sound groove, comprising means for rotating such a record about a spindle passing through said hole and having a phonographic arm pivotally mounted about an axis perpendicular to the plane of said record, said arm having the shape of a two-pronged yoke straddling said record, said yoke having a sound transducer pivotally mounted on one prong thereof about an axis perpendicular to the first-named axis, means normally urging said transducer to engage said sound groove into record-playing relation, and means on the other prong for supporting the portion of the record engaged by said transducer.

2. A phonograph according to claim 1 including a casing for all of said parts, a movable closure for said casing, and means responsive to opening movement of said closure for overcoming said urging means so as to move said transducer out of record-playing relation.

3. A phonograph according to claim 2 wherein said responsive means are additionally responsive to opening movement of said closure for moving said transducer arcuately toward the starting end of said sound groove.

4. A phonograph for flat disc records of the type having a central hole and a spiral sound groove, comprising means for rotating such a record around a spindle engaging said hole, and a phonographic arm having a two-pronged substantially pincers-like shape straddling said record, a sound transducer and a pad, each secured to one free prong of said pincers-like arm, facing one another and thus engaging opposite faces of said record, and means pivotally mounting said arm on said phonograph about an axis perpendicular to the plane of said record.

5. A phonograph for flat disc records of the type having a central hole and a spiral sound groove, comprising means for rotating such a record around a spindle engaging said hole, and a phonographic arm having a U-like member straddling said record, pivotally mounted about an axis perpendicular to the plane of said record, a pad secured to one free end of said U-like member, engaging one face of said record, a second member pivotally mounted on the other free end of said U-like member about an axis perpendicular to the first-named axis and carrying a phonographic transducer whose working tip, such as a phonographic needle, engages the opposite face of said record, thus placing said transducer into record-playing relation to said record, said pad and said working tip engaging opposite faces of said record in pincers-like fashion, urged by spring means attached between said U-like member and said second member, both of said axes positioned to intersect said arm substantially at its effective center of gravity.

6. A phonograph according to claim 5, including a casing having a movable closure, and means responsive to opening movement of said closure for overcoming said spring means so as to move said transducer out of record-playing relation.

7. A phonograph for disc records of the type having a central hole, comprising a locating spindle adapted to enter the central hole of such a record to locate he same in playing position, a pair of opposed rollers positioned to engage opposite faces of said record, and means for driving one of said rollers and thereby rotating said record about said spindle, said spindle and one of said rollers mounted on movable means for concomitant movement thereof away from the plane of said record positioned against the other roller in order to facilitate the insertion and removal of said record into and out of said playing position.

8. A phonograph according to claim 7 including a casing for all of said parts, a movable closure for said casing, and means responsive to opening movement of said closure for operating said movable means.

about said hole while it is movedr.aupic

9. A portable phonograph capable of playing a flat disc-type record having a central hole and a spiral groove about said hole while it is moved about, being free of the gyroscopic effect caused by turntables usually employed in phonographs, said record being rotated about a spindle, entering said hole, by a pair of opposed rollers gripping it on opposite faces, at least one of said rollers being motor-driven, and having a pincers-like phonographic arm gripping faces of said record, the gripping action being between the tip of a sound transducer and a corresponding pad, each secured to one free end of said pincers-like phonographic arm, and means pivotally balancing said phonographic arm about two axes which are respectively parallel to and perpendicular to the plane of said record; both of said axes being positioned to intersect said arm substantially at its effective center of gravity.

References Cited

UNITED STATES PATENTS

| | | | |
|---|---|---|---|
| 3,281,152 | 10/1966 | Narutani | 274—9 |
| 2,391,784 | 12/1945 | Johnston | 274—9 |
| 2,219,230 | 10/1940 | Krause | 274—2 |

LEONARD FORMAN, *Primary Examiner.*

FELIX J. D'AMBROSIO, *Assistant Examiner.*